(12) United States Patent
Kondo

(10) Patent No.: US 10,781,621 B2
(45) Date of Patent: Sep. 22, 2020

(54) HINGE DEVICE AND OFFICE EQUIPMENT USING THE SAME

(71) Applicant: KEM HONGKONG LIMITED, Tsimshatsui Kowloon (HK)

(72) Inventor: Tetsuo Kondo, Kanagawa (JP)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 0 days.

(21) Appl. No.: 15/981,969

(22) Filed: May 17, 2018

(65) Prior Publication Data

US 2018/0347247 A1    Dec. 6, 2018

(30) Foreign Application Priority Data

May 30, 2017  (JP) .................................. 2017-107221

(51) Int. Cl.
| | |
|---|---|
| *E05F 1/12* | (2006.01) |
| *E05D 5/02* | (2006.01) |
| *E05D 11/10* | (2006.01) |
| *G03G 21/16* | (2006.01) |

(Continued)

(52) U.S. Cl.
CPC .............. *E05F 1/1253* (2013.01); *E05D 5/02* (2013.01); *E05D 11/1064* (2013.01); *G03G 21/1633* (2013.01); *H04N 1/00554* (2013.01); *E05D 9/005* (2013.01); *E05Y 2201/10* (2013.01); *E05Y 2201/638* (2013.01); *E05Y 2600/53* (2013.01); *E05Y 2900/608* (2013.01); *G03G 21/1628* (2013.01)

(58) Field of Classification Search
CPC .................................................. E03F 1/1253

USPC ........................................................ 399/380
See application file for complete search history.

(56) References Cited

U.S. PATENT DOCUMENTS

| | | | |
|---|---|---|---|
| 6,456,365 B1 * | 9/2002 | Hosaka | B41J 29/13 347/101 |
| 6,615,019 B2 * | 9/2003 | Fujimoto | G03G 15/605 355/75 |

(Continued)

FOREIGN PATENT DOCUMENTS

| | | |
|---|---|---|
| TW | I339622 | 4/2011 |
| TW | I440765 | 6/2014 |

(Continued)

OTHER PUBLICATIONS

Taiwan Office Action for corresponding Taiwanese patent application No. 107118039, dated Nov. 21, 2018.

*Primary Examiner* — Anthony H Nguyen
(74) *Attorney, Agent, or Firm* — Notaro, Michalos & Zaccaria P.C.

(57) ABSTRACT

A hinge device for opening and closing a relatively lightweight cover, as well as office equipment using such a hinge device. A hinge device includes an attaching part attached to the office equipment side, the supporting part attached to the cover side, a hinge shaft for rotatably coupling the attaching part and the supporting part, a slider provided inside the supporting part so as to be slidable in a direction perpendicular to an axial direction of the hinge shaft, a cam portion formed on the attaching part, a cam bearing portion formed on the slider, an urging means for urging the slider toward the attaching member and bringing the cam bearing portion into a pressurized contact with the cam portion.

7 Claims, 13 Drawing Sheets

(51) Int. Cl.
*H04N 1/00* (2006.01)
*E05D 9/00* (2006.01)

(56) References Cited

U.S. PATENT DOCUMENTS

| | | | | |
|---|---|---|---|---|
| 6,984,144 B1* | 1/2006 | Nelson | G03G 15/605 | 439/374 |
| 8,675,262 B2* | 3/2014 | Hanamoto | H04N 1/00519 | 358/471 |
| 2007/0077085 A1* | 4/2007 | Kitamura | G03G 21/1628 | 399/110 |
| 2007/0199178 A1* | 8/2007 | Katsumata | E05F 1/1261 | 16/286 |
| 2009/0274502 A1* | 11/2009 | Choi | H04N 1/00519 | 399/380 |
| 2014/0201946 A1* | 7/2014 | Yabukoshi | E05F 1/1261 | 16/304 |

FOREIGN PATENT DOCUMENTS

| | | |
|---|---|---|
| TW | I526138 | 3/2016 |
| TW | I575302 | 3/2017 |

\* cited by examiner

HINGE DEVICE AND OFFICE EQUIPMENT USING THE SAME

FIELD OF THE INVENTION

The present invention relates to a hinge device suitable in use for opening and closing a relatively lightweight cover, as well as to office equipment using such a hinge device.

BACKGROUND ART

Conventionally, as is shown in JP Laid-Open Patent Application 2013-159459, a document cover which is equipped with an automatic document feeder for automatically feeding document(s) to a reading device is openably and closably attached using a document cover closer to office equipment, such as copying machine or multifunction printer, with the automatic document feeder.

On a document cover with an automatic document feeder as mentioned above, a document plate, on which a document is put while being automatically delivered to a reading device, is provided as exposed to the outside. If the document plate is provided as always exposed to the outside of office equipment, dust collects on it and the dust is also delivered together with the document, when the document is put on the document plate and thus delivered, so that the dust delivered together with the document hinders a clear copying of the document, and further leads to a failure of the reading device (in particular of the document feeding roller). Still further, if the document plate is always exposed to the outside, it gives a strange impression as per how it appears as compared to the surroundings, depending on its place for installment. Therefore, a cover for covering the document plate was developed, and hinge devices for opening and closing the cover became necessary.

SUMMARY OF THE INVENTION

An object of the invention is to provide a hinge device for opening and closing a relatively lightweight cover which can cover and expose a document plate of a document cover equipped with an automatic document feeder of office equipment such as copying machine or multifunction printer. The hinge device according to the invention is not limited to the above-mentioned.

To achieve the above-mentioned object, a hinge device according to the invention is characterized in that it comprises an attaching member attached to a main body side of office equipment, a supporting member attached to a cover side, a hinge shaft for rotatably coupling the attaching member and the supporting member, a slider provided inside the supporting member so as to be slidable in a direction perpendicular to an axial direction of the hinge shaft, a cam portion formed on the attaching member, a cam bearing portion formed on the slider, an urging means for urging the slider toward the attaching member and bringing the cam bearing portion into a pressurized contact with the cam portion, wherein a rotation torque is generated by the cam portion and the cam bearing portion in a closing direction of the cover, when the cover is rotated from an intermediate opening angle to the maximum opening angle.

A hinge device according to the invention is characterized in that a slider is structured, so as to comprise a stopper portion for abutting against an attaching member, in order to restrict a rotation of a cover, when the cover is opened to the maximum opening angle.

A hinge device according to the invention is further characterized in that an attaching member and a slider are members made of resin, that an urging means is a compression spring made of steel and a supporting member consists of an outer housing made of resin which is fastened and fixed on the cover and an inner housing made of metal which is housed in the outer housing, and that the slider and the urging means are housed in the inner housing.

A hinge device according to the invention is further a hinge device used for office equipment equipped with a document cover having an automatic document feeder, characterized in that it comprises an attaching member attached to the document cover, a supporting member attached to a cover for covering a document plate of the automatic document feeder, a hinge shaft for rotatably coupling the attaching member and the supporting member, a slider provided inside the supporting member so as to be slidable in a direction perpendicular to an axial direction of the hinge shaft, a cam portion formed on the attaching member, a cam bearing portion formed on the slider, an urging means for urging the slider toward the attaching member and bringing the cam bearing portion into a pressurized contact with the cam portion, wherein a rotation torque is generated by the cam portion and the cam bearing portion in a closing direction of the cover, when the cover is rotated from an intermediate opening angle to the maximum opening angle.

A hinge device according to the invention is characterized in that a stopper portion is structured so as to abut against an attaching member in order to restrict a rotation of a cover, when the cover is opened to the maximum opening angle.

In a hinge device according to the invention, it is characterized in that the attaching member and the slider are members made of resin, that the urging means is a compression spring made of steel and the supporting member consists of an outer housing made of resin, fastened and fixed on the cover and an inner housing made of metal which is housed in the outer housing, and that the slider and the urging means are housed in the inner housing.

The invention is further characterized in that in office equipment equipped with a document cover with an automatic document feeder, the document cover is attached to an office equipment main body so as to be openable and closable using a document cover closer, and that a cover for covering a document plate of the automatic document feeder from above is additionally attached to the office equipment main body so as to be openable and closable using each of the hinge devices mentioned above.

The invention is further characterized in that in office equipment as described above, a document cover is structured so as to be openable and closable together with a cover using a document cover closer and hinge devices as described above, and that the cover is structured so as to be independently openable and closable relative to a document plate via the hinge devices.

A hinge device according to the invention opens and closes a cover for covering a document plate of an automatic document feeder of office equipment from above, so that it allows the document plate to be exposed as is necessary, and the automatic document feeder can be used. When the automatic document feeder is not used, the cover is closed, so that dust does not easily collect on a document plate, and such a cover can mitigate a strange impression as per how the document plate appears as compared to the surroundings, due to its continuous exposure.

A hinge device according to the invention is used for office equipment such as copying machine, (multifunction)

printer, so that it can provide office equipment with an excellent outer appearance and with no risk of collecting dust on a document plate.

BRIEF DESCRIPTION OF THE DRAWINGS

As per FIG. 13.

EMBODIMENTS

In the following, embodiments of a hinge device 40 according to the invention and office equipment 1 using this hinge device 40 are described in detail, with reference to attached drawings.

Office equipment 1 shown in FIGS. 1 to 4 is a digital multifunction printer, jointly functioning as copying machine, printer, image scanner and facsimile, however, the office equipment 1 according to the invention is not limited to it, but includes other sorts of office equipment, such as printer and scanner.

Figure 1:
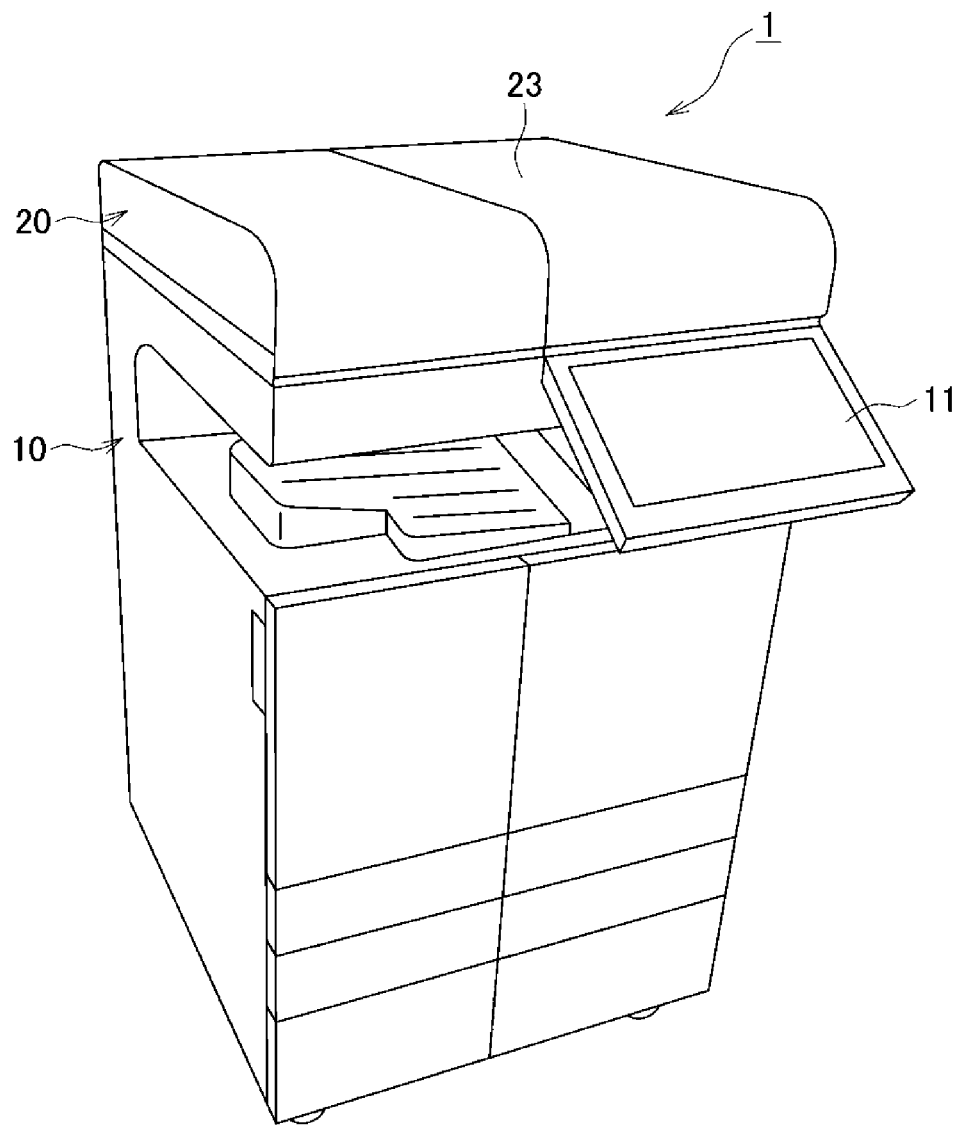
FIG. 1 shows an overall perspective view of an embodiment of office equipment according to the invention.
Figure 2:
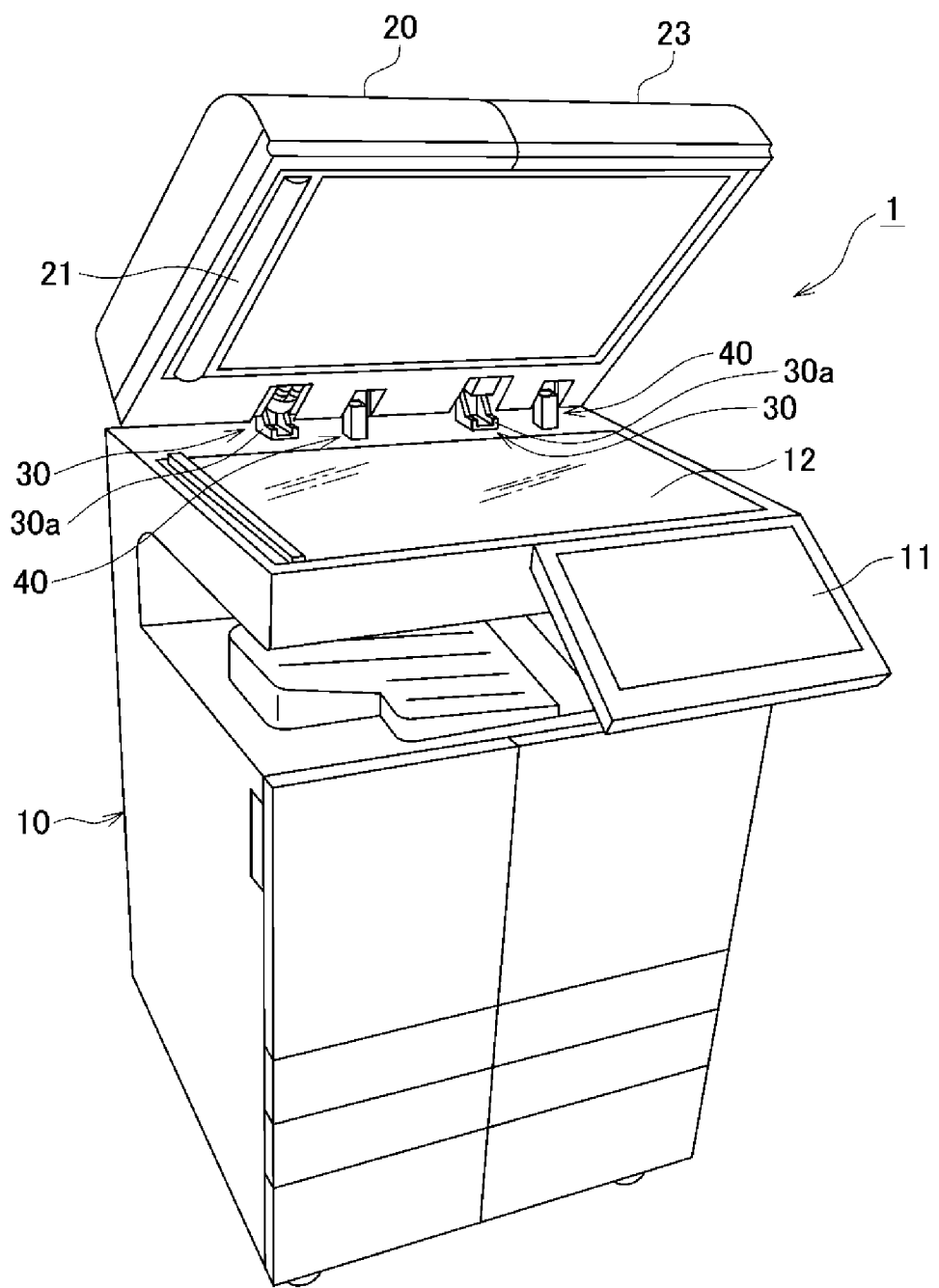
FIG. 2 shows a partial perspective view of a document cover of office equipment, as it is opened.

As shown in FIG. 2, the office equipment 1 comprises a document cover 20 equipped with an automatic document feeder 21 on an office equipment main body 10. A touch panel-based operation portion 11 is provided on an upper front surface portion of the office equipment main body 10.

Figure 4:
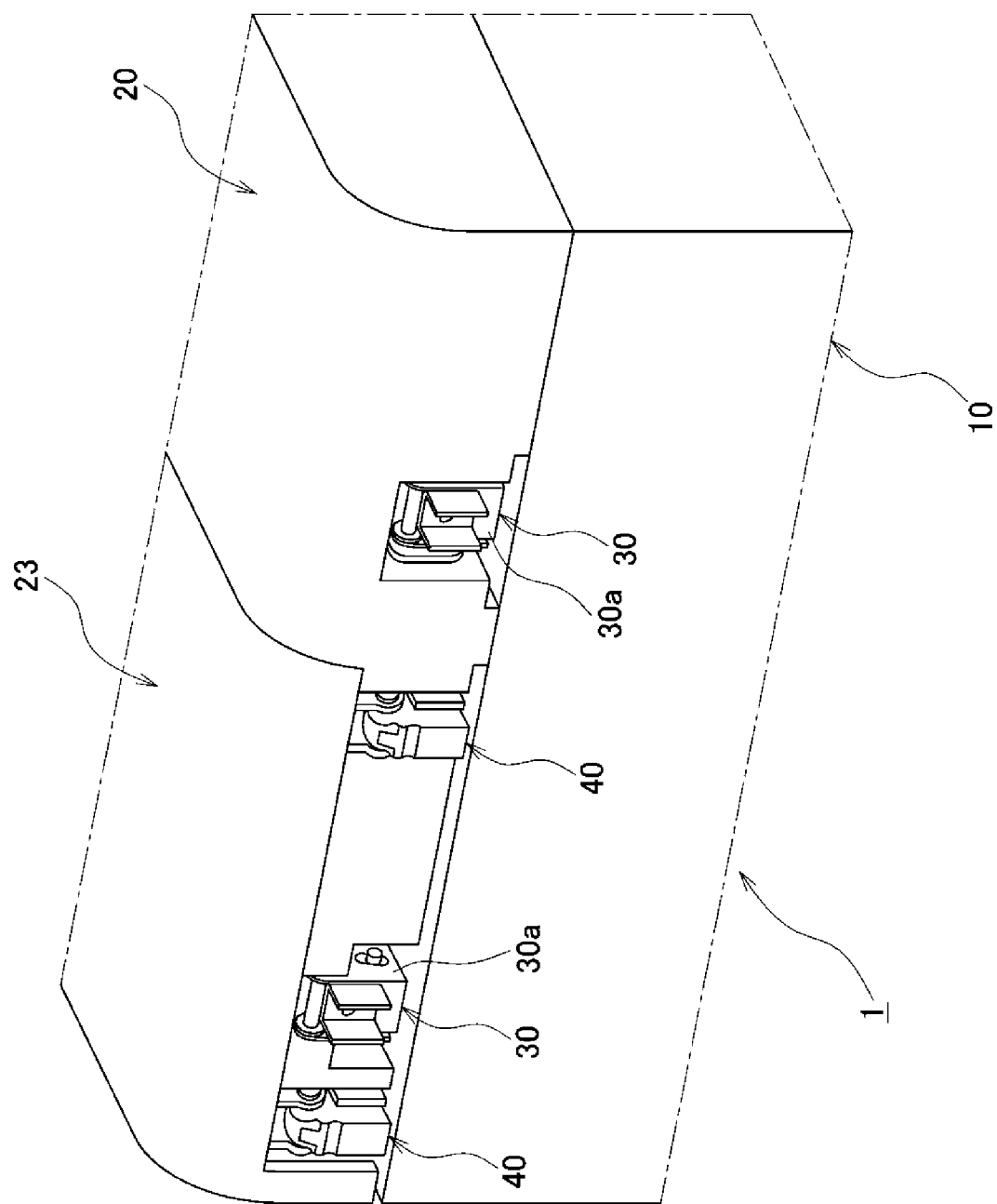
FIG. 4 shows a perspective view of office equipment according to the invention, as is seen from backward.
Figure 5:
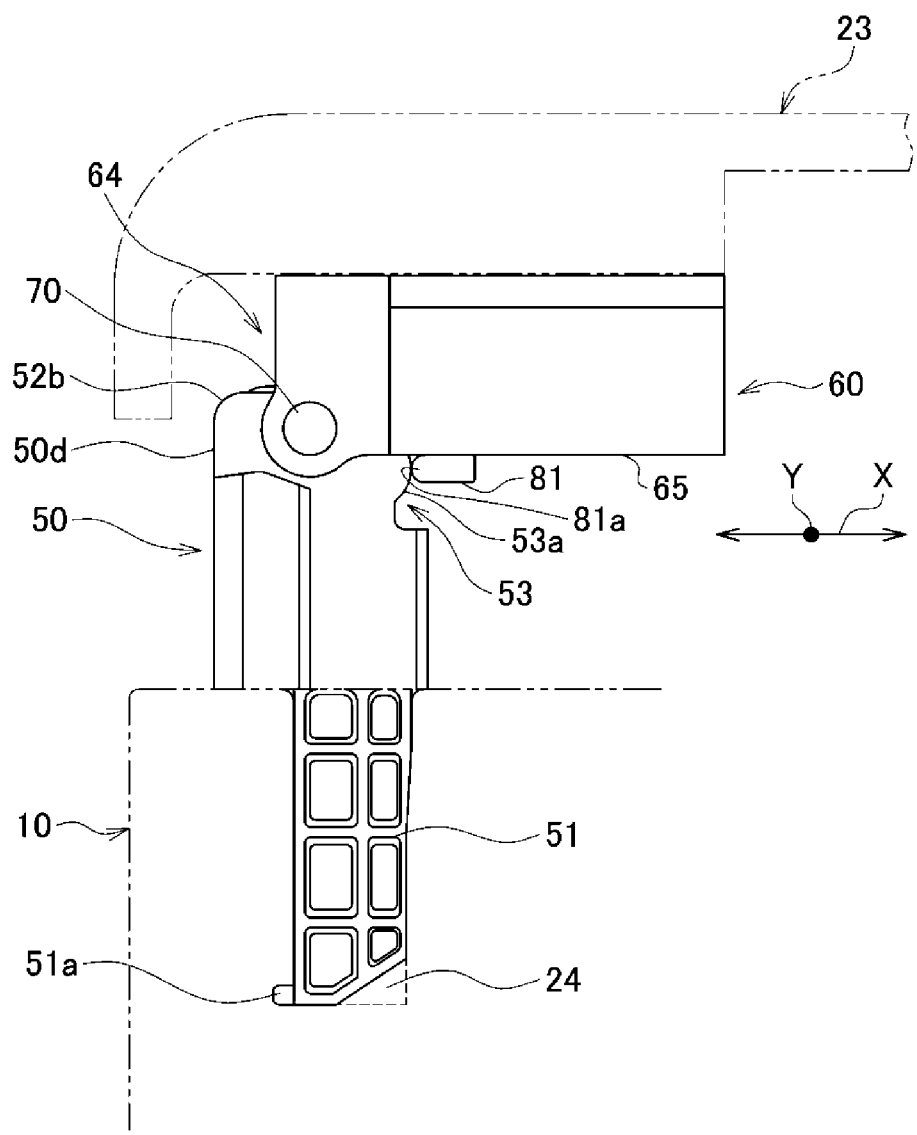
FIG. 5 shows a side view illustrating an embodiment of a hinge device according to the invention.
Figure 6:
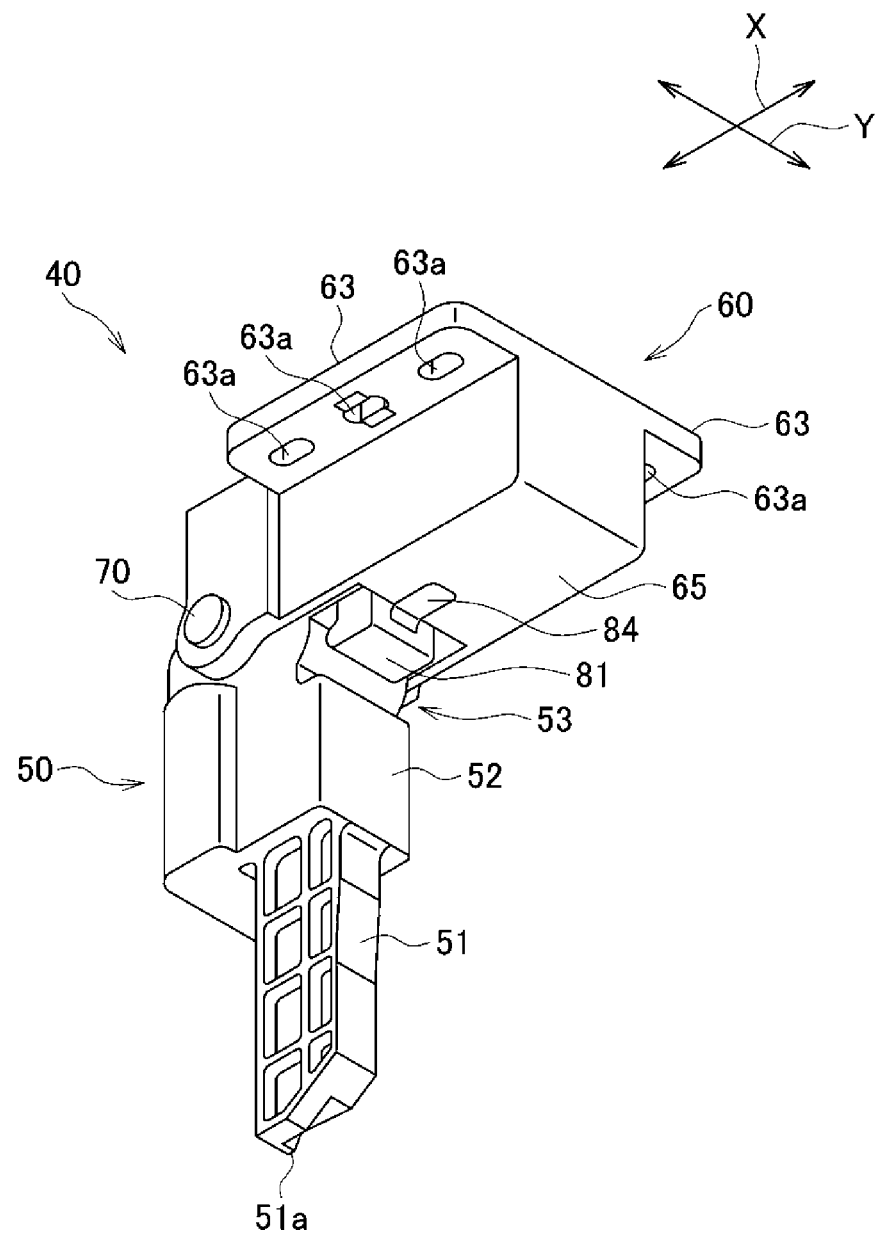
FIG. 6 shows a perspective view of a hinge device.

As shown in FIGS. 2 and 4, a document cover 20 is attached to an office equipment main body 10 so as to be openable and closable using document cover closers 30. Two document cover closers 30 are provided on the right and left close to a rear side of a contact glass 12 occupying most of an upper surface of the office equipment main body 10. A structure of the document cover closers 30 can be the known one, e.g. as shown in JP Laid-Open Patent Application 2013-164502, and is not particularly limited. An attaching member of each of the document cover closers 30 can be structured with one leg, e.g. as is described in JP Laid-Open Patent Application 2012-155096. In this embodiment, a pair of document cover closers 30 which are provided at a predetermined distance, wherein attaching members 30a, 30a attached on the office equipment main body 10. Naturally, the embodiment is not limited to it.

Figure 3:
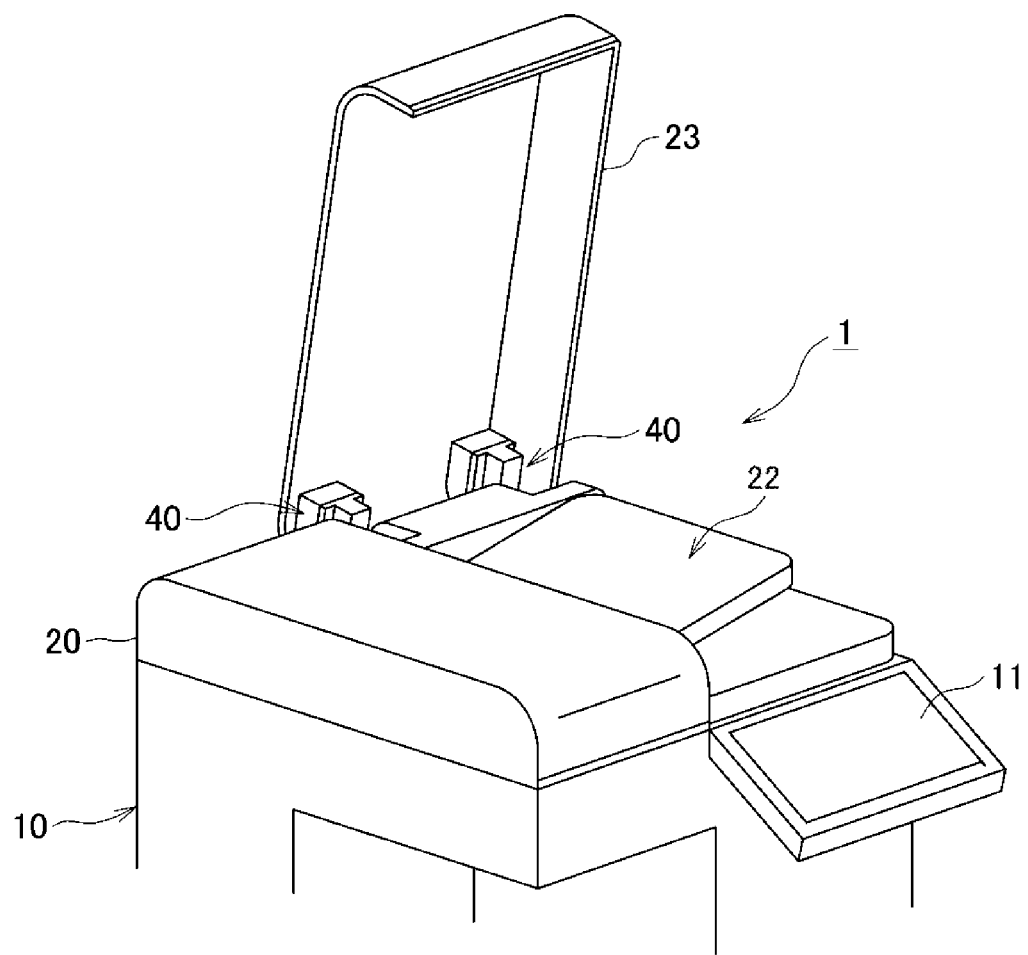
FIG. 3 shows a perspective view of a cover for covering a document plate of a document cover of office equipment, as it is opened.

As shown in FIGS. 3 and 4, a cover 23 for covering a document plate 22 of a document cover 20 according to the invention is attached to a rear portion of an office equipment main body 10 toward its upper end, so as to be openable and closable using hinge devices 40 according to the invention. The hinge devices 40 are provided in the rear on two positions, on the right and left side of the document plate 22. Still further, the cover 23 is more lightweight than the document cover 20, and the hinge devices 40 according to the invention have applications not limited to the office equipment main body 10, but are applicable for opening and closing a relatively lightweight cover 23 of various sorts of equipment other than office equipment 10.

As shown in FIGS. 5 to 8, each of the hinge devices 40 comprises an attaching member 50 (FIG. 9) inserted on the office equipment main body 10 so as to be movable upwards and downwards, a supporting member 60 (FIGS. 10 and 11) attached to a cover 23, a hinge shaft 70 which rotatably couples the attaching member 50 and the supporting member 60, a slider 80 (FIG. 12) provided inside the supporting member 60 so as to be slidable in a direction perpendicular to an axial direction of the hinge shaft 70 (x-axis direction), and a compression spring 90 made of steel, being urging means for urging the slider 80 toward the attaching member 50.

Though an attaching member 50 is shown as the one attached on the office equipment main body 10, the hinge device 40 is not limited to it, but can be also structured, such that its attaching member is attached on a document cover 20 side.

An attaching member 50 is a member made of synthetic resin. As shown in FIGS. 5, and 6 to 9, the attaching member 50 comprises a base portion 51 to be inserted from above into an attaching hole 24 of a document cover 20 and fitted thereto, and a main body portion 52 protruding upwards from the document cover 20. An engaging piece 51a for preventing an escape from the attaching hole 24 is formed on a lower end portion of the base portion 51. A shaft hole 52a through which a hinge shaft 70 is inserted is formed on a middle portion in a forward and backward direction (in the X-axis direction) in vicinity of an upper end of the main body portion 52. The shaft hole 52a runs through the main body portion 52 from right to left (in the Y-axis direction). A cam portion 53 is formed on a front end portion on an upper end portion of the main body portion 52. A slide contact surface 52b in contact with a slide contact surface 85a (FIG. 12) formed on the slider 80 to be described below is formed on a rear edge portion on an upper end portion of the main body portion 52. An engaging portion 52c in contact with an engaging portion 81b formed on the slider 80 to be described below is formed on a middle portion (in the forward and backward direction) on the upper end portion of the main body portion 52.

Figure 7:
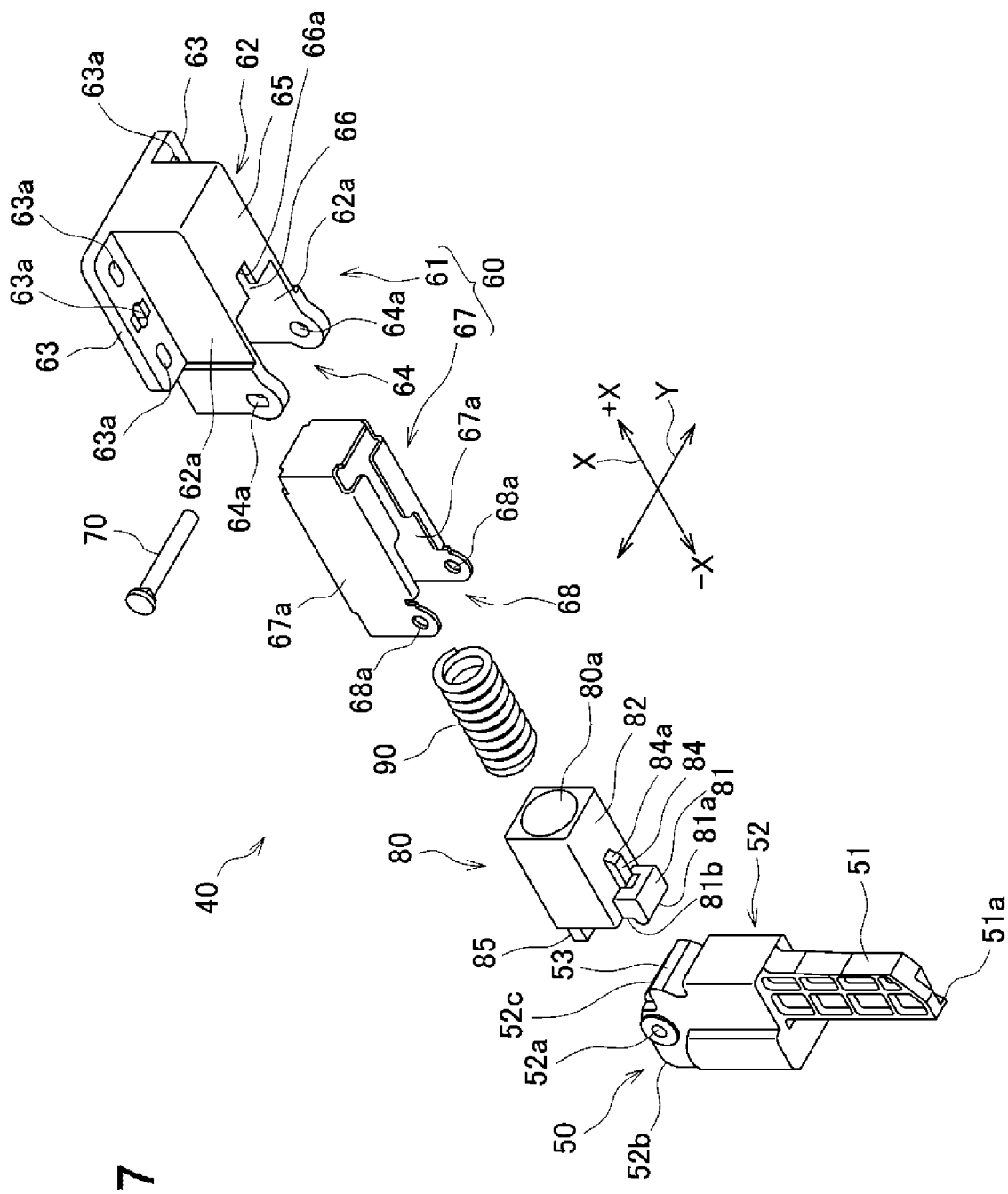
FIG. 7 shows an exploded perspective view of a hinge device.
Figure 8:
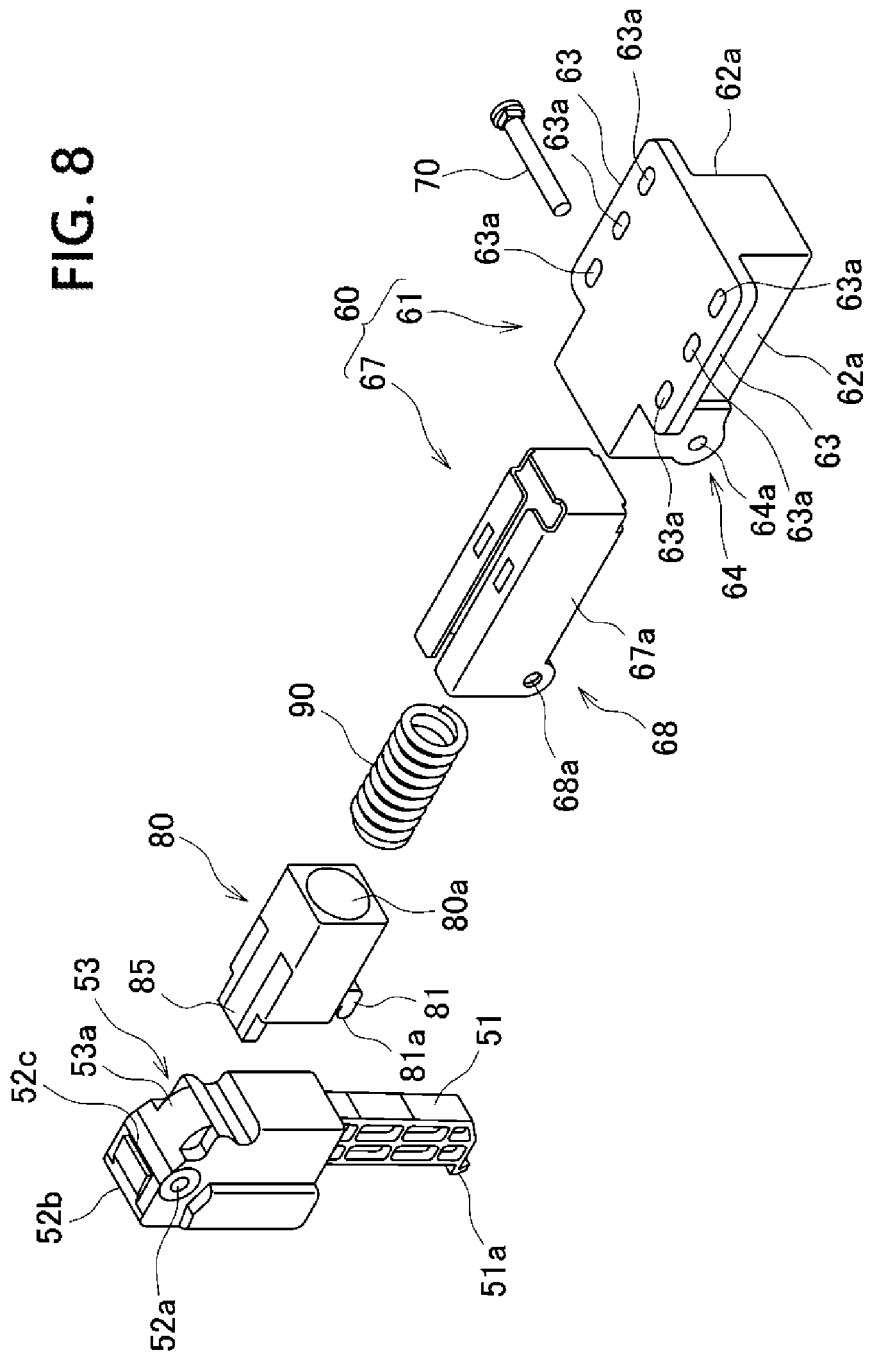
FIG. 8 shows an exploded perspective view of a hinge device from a different point of view.
Figure 9:
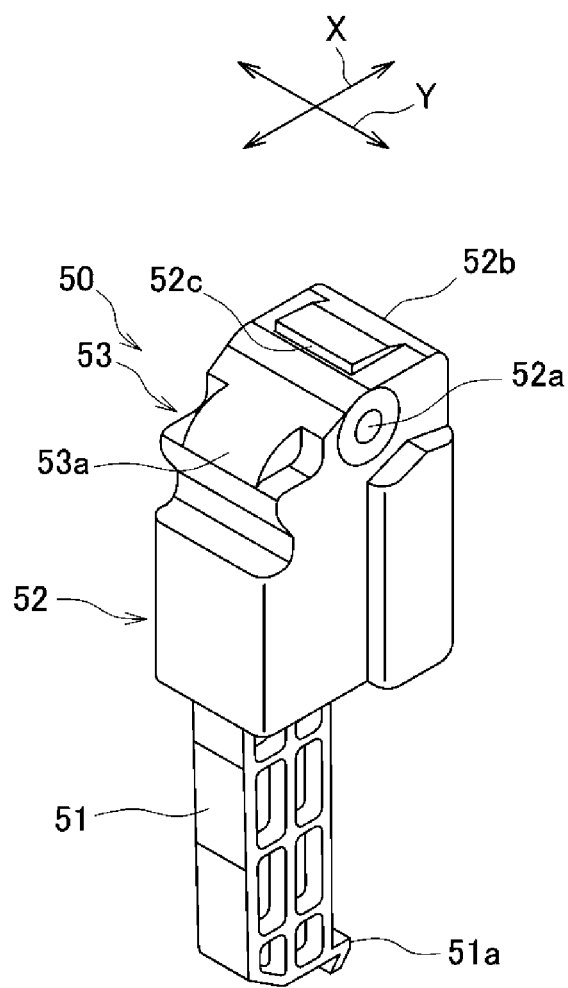
FIG. 9 shows a perspective view of an attaching member of a hinge device.

As shown in FIGS. 7 and 8, a supporting member 60 consists of an outer housing 61 fastened and fixed on a cover 23 and an inner housing 67 housed in the outer housing 61.

Figure 10:
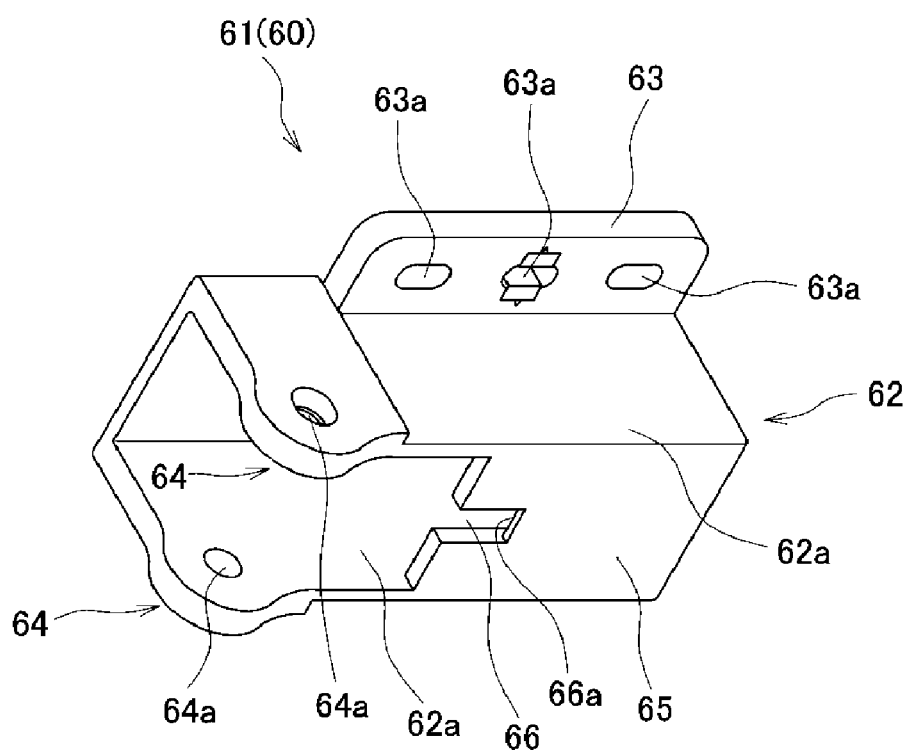
FIG. 10 shows a perspective view of an outer housing of a hinge device.

The outer housing 61 is a member made of synthetic resin. As shown in FIGS. 7, 8 and 10, the outer housing 61 consists of a box-shaped main body portion 62 for housing an inner housing 67 (FIG. 11), flange portions 63 protruding from upper end edges of the main body portion 62 to the right and left, and bracket portions 64 formed on a rear end portion of the main body portion 62. A plurality of elongated holes 63*a* for fastening and fixing a supporting member 60 on a cover 23 are provided on each of the flange portions 63. The bracket portions 64 are respectively composed of side plates 62*a* on the right and left of the main body portion 62, and a pair of shaft holes 64*a* on the right and left, through both of which a hinge shaft 70 is inserted, are formed on a rear end on a lower end portion of each of the side plates 62*a*.

A guide concave portion 66 for receiving a guide projection 84 of a slider 80 to be described below is formed on a middle portion in the right and left direction on a rear end portion of a bottom plate 65 of a main body portion 62. The main body portion 62 has an opening to the rear, and an inner housing 67 is inserted from backward into the main body portion 62 and thus housed therein.

Figure 11:
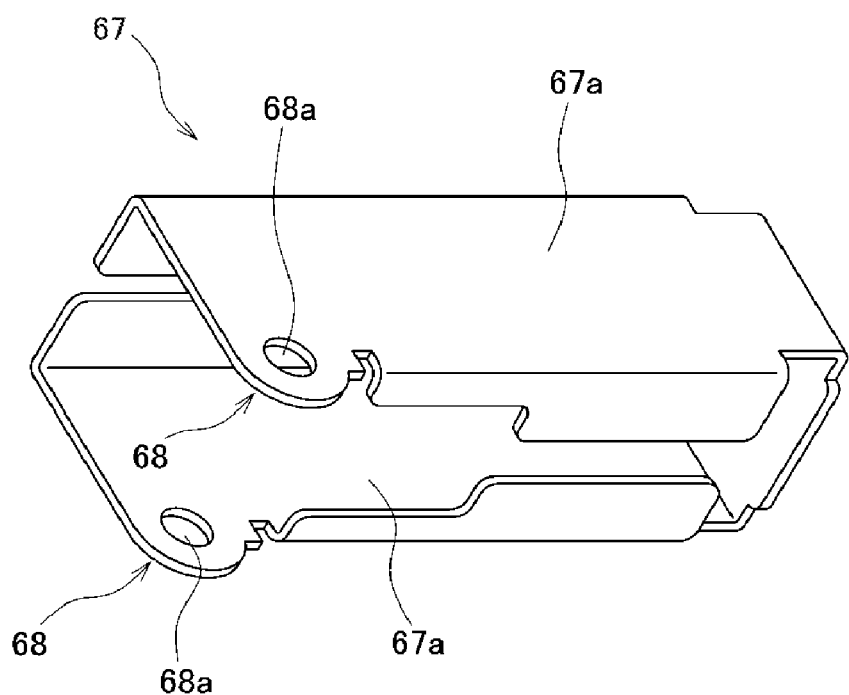
FIG. 11 shows a perspective view of an inner housing of a hinge device.

An inner housing 67 is made up of a metal plate punched out and bent. The inner housing 67 is a box-shaped member, which is just fitted to an inner surface of a main body portion 62 of an outer housing 61. As shown in FIGS. 7, 8 and 11, a pair of bracket portions 68 is formed on a rear end portion of the inner housing 67. The bracket portions 68 are respectively composed of side plates 67*a* of bracket portions 68 on the right and left of the inner housing 67, and a pair of shaft holes 68*a* on the right and left, through both of which a hinge shaft 70 is inserted, are formed on a rear end on a lower end portion of each of the side plates 67*a*. The inner housing 67 has an opening backwards, and a slider 80 and a compression spring 90 are inserted from backward into the inner housing 67 and thus housed therein. In the meantime, a hinge device 40 according to the invention can be also structured such that it uses no inner housing 67 as described above.

Figure 12:
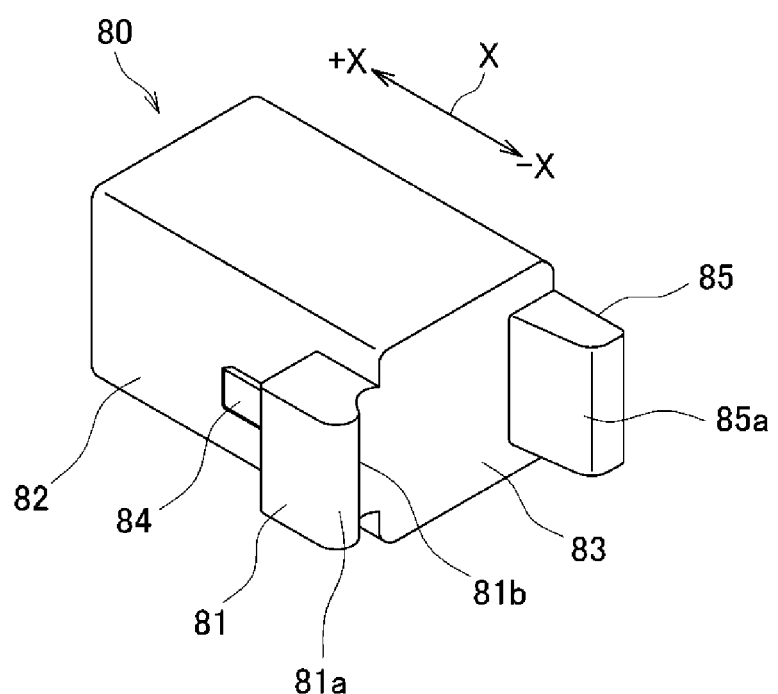
FIG. 12 shows a perspective view of a slider of a hinge device.

A slider 80 is a box-shaped member made of synthetic resin which is in slide contact with an inner housing 67. As shown in FIGS. 7, 8 and 12, the slider 80 comprises a cylindrical spring housing portion 80*a* having an opening toward the front (in a direction of +x), and is housed into the inner housing 67, as a compression spring 90 is housed in the spring housing portion 80*a* of the slider. A cam bearing portion 81 abutting against a cam portion 53 of an attaching member 50 is formed on a lower portion on a rear end portion (an end portion toward −x) of the slider 80.

As shown in FIGS. 7 and 12, a cam bearing portion 81 protrudes downward from a lower surface 82 of the slider 80. A rear end of the cam bearing portion 81 projects backward from a rear end surface 83 of the slider 80, thus making up a cam bearing surface 81*a* in a circular arc shape as seen from the side. A lateral surface toward the rear end surface 83 of the cam bearing portion 81 constitutes an engaging portion 81*b* engaged with an engaging portion 52*c* of an attaching member 50.

A guide projection 84 is provided on a middle portion in the right and left direction on a rear portion of a lower surface 82 of a slider 80. The guide projection 84 extends from a front surface of a cam bearing portion 81 to the front. A projection size of the guide projection 84 from the lower surface 82 is substantially half a projection size of the cam bearing portion 81 from a lower surface 82. The guide projection 84 is received in a guide concave portion 66 of an outer housing 61, so as to be movable forward and backward. A front end 84*a* of the guide projection 84 abuts against the deepest portion 66*a* of the guide concave portion 66, so that a movement of the slider 80 to the front is limited. At this moment, a hinge device 40 is in a state shown in FIG. 5.

As shown in FIGS. 7, 8 and 12, a plate-shaped stopper portion 85 is provided on an upper end portion on a rear end surface 83 of a slider 80. The stopper portion 85 protrudes backward from the rear end surface 83, and extends from a position in vicinity of the left side end to a position in vicinity of the right side end of the rear end surface 83. The stopper portion 85 abuts against a back surface 50*a* of an attaching member 50, when a cover 23 is opened to the maximum opening angle (see FIG. 13D). A slide surface 85*a* in a projecting circular arc shape as seen from the side is formed on a projecting portion of the stopper portion 85, wherein it is brought into a slide contact with a slide contact surface 52*b* of the attaching member 50, just before the cover 23 is opened to the maximum opening angle.

A hinge device 40 structured as described above is assembled by housing an inner housing 67 in an outer housing 61, housing a slider 80 and a compression spring 90 in the inner housing 67, and then rotatably coupling via a hinge shaft 70 a supporting member 60 consisting of the outer housing 61 and the inner housing 67 on one hand and an attaching member 50 on the other.

Then, flange portions 63 of a supporting member 60 are fastened and fixed to a cover 23, and a base portion 51 of the attaching member 50 is fitted into an attaching hole 24 provided on an office equipment main body 10 and fixed thereto, so that the cover 23 for covering a document plate 22 of a document cover 20 with an automatic document feeder 21 is attached to an office equipment main body 10 via hinge devices 40 so as to be openable and closable relative to the office equipment main body 10.

Next, reference is made to an operation of the hinge device 40 structured as described above, with reference to FIGS. 13A to 13D.

Figure 13A:
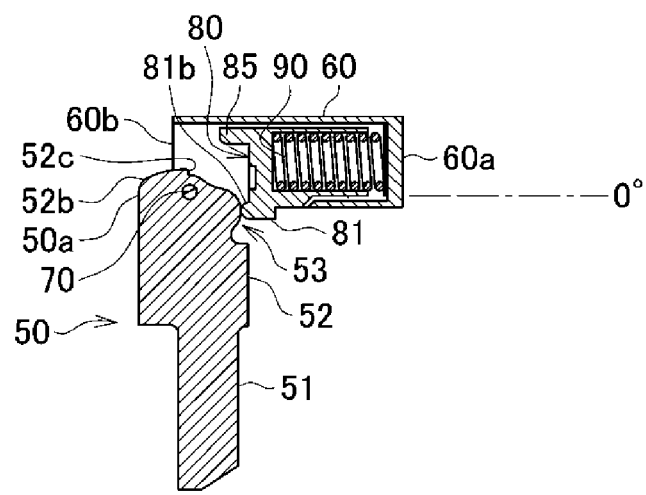
FIG. 13A shows a cross section illustrating a state of a hinge device, as a cover is closed.

When the cover 23 is fully closed, as shown in FIG. 13A, the cam bearing portion 81 of the slider 80 abuts against the cam portion 53 of the attaching member 50 (opening angle: 0 degree). At this point, the cam bearing surface 81*a* of the cam bearing portion 81 is in contact with the lower portion of the cam surface 53*a* of the cam portion 53. When the cover 23 is opened from this state, as accompanied with a rotation of the supporting member 60 relative to the attaching member 50, the cam bearing portion 81 moves in slide contact with the cam surface 53*a* of the cam portion 53, so that the slider 80 moves toward the tip 60*a* of the supporting member 60, and the compression spring 90 is compressed. At this point, the torque of the cover 23 increases.

Figure 13B:
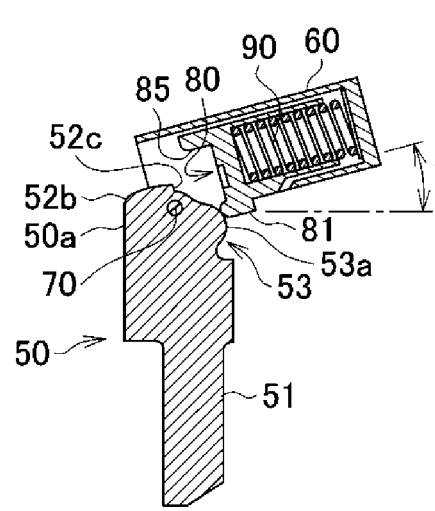
FIG. 13B shows a cross section illustrating a state of a hinge device, as a cover is slightly opened from a closed state.

FIG. 13B shows the state of the hinge device 40 at the opening angle of 10 degrees of the cover 23. At this point, the slider 80 moves the farthest toward the tip 60*a* of the supporting member 60, and the compression spring 90 is most compressed, so that, with the greatest repulsive force by the compression spring 90, the slider 80 abuts against the cam surface 53*a* of the cam portion 53.

When the cover 23 is further opened from the state of FIG. 13B, as accompanied with a rotation of the supporting member 60 relative to the attaching member 50, the cam bearing portion 81 of the slider 80 moves in slide contact with the cam surface 53*a* of the cam portion 53, so that the slider 80 moves toward the base end 60*b* of the supporting member 60, and the compression spring 90 is released from compression. At this point, the torque of the cover 23 decreases.

Figure 13C:
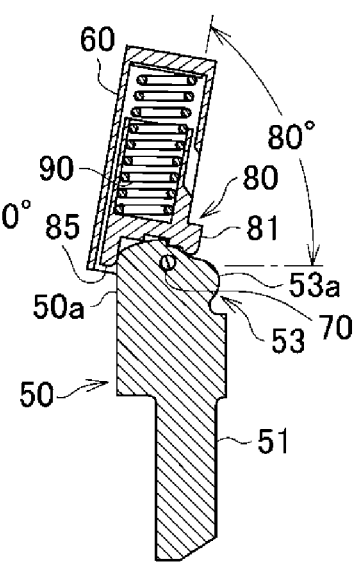
FIG. 13C shows a cross section illustrating a state of a hinge device, as a cover is in a self-standing state.

FIG. 13C shows the state of the hinge device 40 at the opening angle of 80 degrees of the cover 23. At this point, the engaging portion 81*b* of the slider 80 is engaged with the engaging portion 52*c* of the attaching member 50. And then, the torque of the cover 23 takes almost the minimum value. Therefore, in its movement from the state of FIG. 13B to that of FIG. 13C, the cover 23 can be rotated with a relatively small force. And then, in the state of FIG. 13C, the gravity center of the cover 23 is located just above the hinge shaft 70, and the cover 23 is stably maintained in the self-standing and stable state.

Figure 13D:
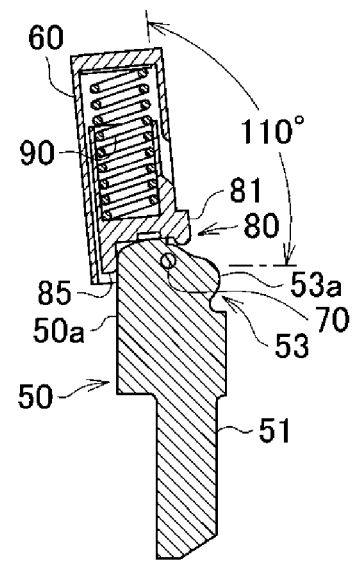
FIG. 13D shows a cross section illustrating a state of a hinge device, as a cover is opened to the maximum opening angle.

When the cover 23 is further opened from the state of FIG. 13C, as accompanied with a rotation of the supporting member 60 relative to the attaching member 50, the engaging portion 81b of the slider 80 passes by the engaging portion 52c of the attaching member 50 to move to the uppermost end of the attaching member 50, and as shown in FIG. 13D, the stopper portion 85 of the slider 80 abuts against the back surface 50a of the attaching member 50. At this point, the cover 23 is at the maximum opening angle (95 degrees). When the engaging portion 81b of the slider 80 passes by the engaging portion 52c of the attaching member 50, the slider 80 moves toward the base end 60b of the supporting member 60, and the compression spring 90 is compressed, so that, while the cover 23 is in transition from the self-standing state to the maximum rotation angle, the rotational torque acts on the cover 23 in the closing direction. And then, the stopper portion 85 of the slider 80 abuts against the back surface 50a of the attaching member 50, so that a further rotation of the cover 23 is restricted.

Next, in office equipment 1 according to the invention, a document cover 20 is attached so as to be openable and closable using document cover closers 30, and a cover 23 for covering a document plate 22 of an automatic document feeder 21 from above is further attached on an office equipment main body 10 so as to be openable and closable using hinge devices 40, so that it allows the document plate 22 to be exposed as is necessary, and the automatic document feeder 21 can be used. When the automatic document feeder 21 is not used, the cover 23 is closed, so that dust does not easily collect on the document plate 22, and such a cover can mitigate a strange impression as per how the document plate 22 appears as compared to its surroundings, due to its continuous exposure. Still further, hinge devices 40 according to the invention can be used as attached to the document cover 20 side, or as attached to the office equipment main body 10 side, as is the case in this embodiment. In the latter case, when the document cover 20 is opened and closed, hinge devices 40 are opened and closed at the same time.

Still further, in office equipment 1 according to the invention, if a document is copied using an automatic document feeder 21, a document cover 20 is not opened and closed, so it is enough to keep a cover 23 open, however, if a document is copied on a contact glass 12, it is necessary to open and close the document cover 20 via document cover closers 30. In this case, the cover 23 is opened together via hinge devices 40. Moreover, the cover 23 can be also opened relative to the document plate 22 via hinge devices 40. Still further, in this embodiment, when the document cover 20 once opened is to be closed, the cover 23 remains opened, but it can be also structured such that both are linked to each other using a link member (not shown), while they are opened and closed. Still further, if the cover 23 is attached to the document cover 20 so as to be openable and closable relative to the latter, the document cover 20 can be opened and closed in a state as shown in FIG. 13A, while the cover 23 remains closed. Next, in a state as shown in FIG. 13C the cover 23 can be opened up to a self-standing state (opening angle: 80 degrees) so that the automatic document feeder 21 can be used, and also fully opened in a state as shown in FIG. 13D (maximum opening angle: 110 degrees) so that jobs such as paper jam clearance can be done. Then, when the cover 23 is rotated from an opening angle in the self-standing state to the maximum opening angle, hinge devices 40 generate a rotational torque in a closing direction of the cover 23, which can prevent the cover 23 from suddenly opening from the self-standing state to a fully opened state.

Still further, from a state as shown in FIG. 13A (opening angle: 0 degree) to that as shown in FIG. 13B (opening angle: 10 degree), hinge devices 40 generate a rotational torque in a closing direction of the cover 23, which enables the cover 23 to be forcibly closed from an intermediate opening state as shown in FIG. 13B in a closing operation of the cover 23, as well as can prevent the cover 23 from jumping up.

Still further, in hinge devices 40 of this embodiment, synthetic resin mold pieces are used for an outer housing 61 of a supporting member 60, an attaching member 50 and a slider 80, so that production costs can be reduced as compared to the case in which materials such as pressed metal plates are used. Still further, metal members are used for an inner housing 67 of a supporting member 60 on which the force of a steel-made compression spring 90 directly acts, so that a sufficient durability for hinge devices of a cover 23 which is frequently opened and closed.

In the meantime, the embodiments of the invention are not limited to the foregoing, but can be varied, replaced and deformed in various manners, without deviating from the purport of the technical idea of the invention.

For example, office equipment 1 according to an embodiment as in the foregoing is a digital multifunction printer, jointly functioning as copying machine, printer, image scanner and facsimile, however, the office equipment according to the invention is applicable for all sorts of office equipment equipped with a document cover having a document feeder. For example, it is also applicable for various sorts of dedicated equipment, such as copying machine, image scanner and facsimile.

Still further, the supporting member 60 is composed of an outer housing 61 made of synthetic resin and an inner housing 67 made of metal, but the supporting member 60 as a whole can be a synthetic resin mold piece, or supporting member 60 as a whole can be a pressed metal plate.

What is claimed is:

1. A hinge device comprising an attaching member attached to a main body of office equipment;
    a supporting member attached to a cover;
    a hinge shaft for rotatbly coupling said attaching member and said supporting member;
    a slider provided inside the supporting member so as to be slidable in a direction perpendicular to an axial direction of said hinge shaft;
    a cam portion formed on said attaching member;
    a cam bearing portion formed on said slider; and
    an urging means for urging said slider toward said attaching member and bringing said cam bearing portion into a pressurized contact with said cam portion;
    a rotational torque being generated by said cam portion and the cam bearing portion in a closing direction of said cover, while said cover being rotated from a predetermined intermediate opening angle to the maximum opening angle,
    wherein said slider comprises a stopper portion for abutting against said attaching member in order to restrict a rotation of said cover, when said cover is rotated to said maximum opening angle;
    said stopper portion is provided in a plate shape on an upper end portion on an end surface of an attaching member side of said slider;
    said stopper portion protruding toward said attaching member from said end surface of said attaching member side of said slider, and extending from a position in vicinity of the left side end to a position in vicinity of the right side end of said end surface of said attaching member side of said slider;

said stopper portion abutting against a back surface of said attaching member, when said cover is opened to said maximum opening angle;

a slide surface in a projecting circular arc shape as seen from a side is formed on a projecting portion of said stopper portion, wherein it is brought into a slide contact with a slide contact surface of said attaching member, just before said cover is opened to said maximum opening angle.

2. A hinge device according to one of claim 1, wherein said attaching member and said slider are members made of resin,
said urging means is a compression spring made of steel,
said supporting member consists of an outer housing made of resin, fastened and fixed on said cover and an inner housing made of metal, housed in said outer housing,
said slider and said urging means are housed in said inner housing,
a guide concave portion being formed on a bottom of a middle portion in a right and left direction on an end portion of an attaching member side of said outer housing;
a guide projection being provided on the middle portion in a right and left direction on a portion of an attaching member side of a lower surface of said slider;
said guide projection extending from a front surface of said cam bearing portion in a direction away from said attaching member;
a projection size of said guide projection from said lower surface being substantially half a projection size of said cam bearing portion from said lower surface;
said guide projection being received in said guide concave portion of said outer housing, so as to be movable in a direction perpendicular to an axial direction of said hinge shaft;
an end of a far side from said attaching member of said guide projection abutting against a deepest portion of said guide concave portion, so that a movement of said slider to a direction away from said attaching member is limited.

3. A hinge device used for office equipment equipped with a document cover comprising an automatic document feeder, said hinge device comprising:
an attaching member attached to said document cover;
a supporting member attached to a cover for covering a document plate of said automatic document feeder;
a hinge shaft for rotatably coupling said attaching member and said supporting member;
a slider provided inside the supporting member so as to be slidable in a direction perpendicular to an axial direction of said hinge shaft;
a cam portion formed on said attaching member;
a cam bearing portion formed on said slider;
an urging means for urging said slider toward said attaching member and bringing said cam bearing portion into a pressurized contact with said cam portion;
a rotational torque being generated by said cam portion and the cam bearing portion in a closing direction of said cover while said cover being rotated from a predetermined intermediate opening angle to the maximum opening angle, wherein said slider comprises a stopper portion for abutting against said attaching member in order to restrict a rotation of said cover, when said cover is rotated to said maximum opening angle;

said stopper portion being provided in a plate shape on an upper end portion on an end surface of an attaching member side of said slider;

said stopper portion protruding toward said attaching member from said end surface of said attaching member side of said slider, and extending from a position in vicinity of the left side end to a position in vicinity of the right side end of said end surface of said attaching member side of said slider;

said stopper portion abutting against a back surface of said attaching member, when said cover is opened to said maximum opening angle;

a slide surface in a projecting circular arc shape as seen from a side being formed on a projecting portion of said stopper portion, wherein it is brought into a slide contact with a slide contact surface of said attaching member, just before said cover is opened to said maximum opening angle.

4. The hinge device according to claim 3, wherein predetermined intermediate opening angle is an opening angle when said cover is in self-standing state.

5. The hinge device according to claim 4, wherein said attaching member and said slider are members made of resin,
said urging means is a compression spring made of steel;
said supporting member consists of an outer housing made of resin, fastened and fixed on the cover and an inner housing made of metal and housed in the outer housing, and
said slider and said urging means are housed in said inner housing,
a guide concave portion being formed on a bottom of a middle portion in a right and left direction on an end portion of an attaching member side of said outer housing;
a guide projection being provided on the middle portion in a right and left direction on a portion of an attaching member side of a lower surface of said slider;
said guide projection extending from a front surface of said cam bearing portion in a direction away from said attaching member;
a projection size of said guide projection from said lower surface being substantially half a projection size of said cam bearing portion from said lower surface;
said guide projection being received in said guide concave portion of said outer housing, so as to be movable in a direction perpendicular to an axial direction of said hinge shaft;
an end of a far side from said attaching member of said guide projection abutting against a deepest portion of said guide concave portion, so that a movement of said slider to a direction away from said attaching member is limited.

6. Office equipment equipped with a document cover with an automatic document feeder, said document cover being attached to an office equipment main body so as to be openable and closable using a document cover closer, and said cover for covering a document plate of said automatic document feeder from above being additionally attached to said office equipment main body so as to be openable and closable using hinge devices according to claim 1.

7. Office equipment, a document cover being structured so as to be openable and closable using the document cover closer and the hinge devices, and said cover being structured so as to be independently openable and closable relative to the document plate via the hinge devices according to claim 6.

* * * * *